Inventors
Robert G. Ball
Gerald H. Perry
John Wood

Inventors
Robert G. Ball
Gerald H. Perry
John Wood

Inventors
Robert G. Ball
Gerald H. Perry
John Wood

Inventors
Robert G. Ball
Gerald H. Perry
John Wood

Inventors
Robert G. Ball
Gerald H. Perry
John Wood

Inventors
Robert G. Ball
Gerald H. Perry
John Wood

Inventors
Robert G. Ball
Gerald H. Perry
John Wood

United States Patent Office 3,431,433

Patented Mar. 4, 1969

3,431,433

DIGITAL STORAGE DEVICES USING FIELD EFFECT TRANSISTOR BISTABLE CIRCUITS

Robert George Ball, 26 Clerkenwell Crescent, Gerald Horace Perry, 56 Barnards Green Road, and John Wood, Geraldine Staff Club, Geraldine Road, all of Malvern, England Filed May 28, 1965, Ser. No. 459,628

Claims priority, application Great Britain, May 29, 1964, 22,344/64; Oct. 26, 1964, 43,518/64

U.S. Cl. 307—221 19 Claims

Int. Cl. H03k 23/08, 23/22, 23/30

The present invention relates to digital storage devices.

It is known that a bistable circuit having negligible quiescent power consumption can be made using two complementary pairs of Insulated gate enhancement type field effect transistors (hereinafter called I.G. transistors) and no other components. This circuit may be used as a digital storage element, or one stage in a shift register. However, until now no convenient method of transferring information from one bistable to another (for example as in the Read and Write operations in a digital store) has been found.

It is an object of the invention to provide a method of transferring information from one bistable to another.

It is a further object of the invention to provide such a method which will dissipate the minimum possible energy, in order to preserve the low power consumption of complementary I.G. transistor circuits.

It is a further object of the invention to provide such a method which will be economical in the number of I.G. transistors used, and use no other components (for ease of integration), or at any rate a minimum number of other components.

It is a further object of the invention to provide such a method which will not change the state of the bistable being read i.e. the read out is to be non-destructive.

According to the present invention there is provided a digital storage device comprising a first bistable circuit comprising two complementary pairs of transistors, a connection between the output of one complementary pair of transistors and the input to the other complementary pair of transistors, and a connection between the output of said other complementary pair of transistors and the input to said one complementary pair of transistors; a second bistable circuit comprising two complementary pairs of transistors, a connection between the output of one complementary pair of transistors and the input to the other complementary pair of transistors, and a connection between the output of said other complementary pair of transistors and the input to said one complementary pair of transistors; means for making a connection between the output of one complementary pair of transistors in said first bistable and the input to one complementary pair of transistors in said second bistable; and means for rendering said second bistable circuit inoperative at a time when said means for making a connection is operated.

The invention will be more specifically described by way of example with reference to the accompanying drawings, in which.

Similar reference characters are used in different drawings to refer to similar elements.

Figure 1:
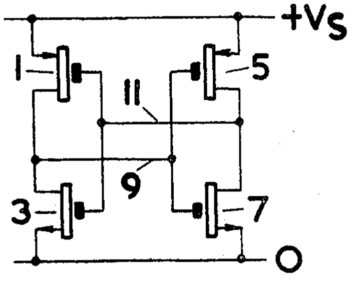
FIGURE 1 is a circuit diagram of a known bistable circuit.

FIGURE 1 is a circuit diagram of a known bistable circuit. A p-channel I.G. transistor 1 is connected in series with an n-channel I.G. transistor 3 across a voltage source $V_s$, the transistor 1 being on the positive side. The drain electrodes of the transistors are connected together, as are the gate electrodes. Two further M.O.S. transistors 5, 7 are connected in the same configuration, and the commoned drain electrodes of the transistors 1 and 3 are connected by a line 9 to the commoned gate electrodes of the transistors 5 and 7. Similarly the commoned gate electrodes of the transistors 1 and 3 are connected by a line 11 to the commoned drain electrodes of the transistors 5 and 7.

The resulting circuit is a bistable circuit the two stable states of which are characterised by the lines 9 and 11 being at voltages of O and $V_s$ respectively and vice versa. The lines such as 9 and 11 in such circuits are hereinafter called nodes.

Figure 2:
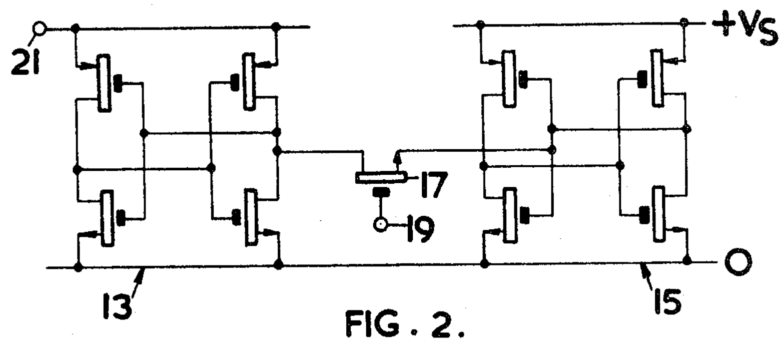
FIGURE 2 is a circuit diagram of a circuit for setting a bistable circuit into a desired stable state.

FIGURE 2 is a circuit diagram of a circuit for setting the bistable circuit of FIGURE 1 into a desired stable state. A bistable circuit 13 and a bistable circuit 15 are both similar to the bistable circuit of FIGURE 1. An n-channel M.O.S. transistor 17 is connected between corresponding nodes of the bistable circuits. The gate electrode of the transistor 17 is connected to a terminal 19. The voltage of the source electrodes of the p-channel transistors in the bistable circuit 13, normally $V_s$, is controlled via a terminal 21.

The action of the circuit is as follows. Since the bistable circuit of FIGURE 1 is, ideally, symmetrical, if the supply voltage is reduced to zero for a time sufficient for all voltages in the circuit to decay to zero, and then raised to its normal value $+V_s$ again, the state taken up by the bistable is determined randomly. To ensure that a particular state is taken up, it is only necessary to apply a very small bias to the circuit sufficient to disturb its symmetry in the required direction. This means that negligible power is required.

For example, suppose it is required to copy the state of the bistable circuit 15 in FIGURE 2 into the bistable circuit 13. The supply voltage to the bistable circuit 13 is reduced to zero via the terminal 21 and at the same time the transistor 17 is turned on via the terminal 19 and its gate electrode to provide a low-impedance path between corresponding nodes on the two bistable circuits. After the circuit voltages have reached a steady value, no current flows in the transistor 17, and therefore the voltages of the nodes between which it is connected are equal, at O or $+V_S$ volts. When the supply is restored to the bistable circuit 13, the voltage of the node connected, via the transistor 17, to the corresponding node of the bistable circuit 15 unbalances the bistable circuit 13 sufficiently to ensure that it takes up the same state as the bistable circuit 15. The transistor 17 may then be turned off. Since negligible power is drawn from the bistable circuit 15, its state is not changed; in other words, readout is non-destructive. This system therefore satisfied the requirements stated above. It also has the advantage that either bistable circuit can be used to set the other, by interrupting the supply voltage of the bistable circuit being set; in other words the flow of information is bidirectional.

Figure 3:
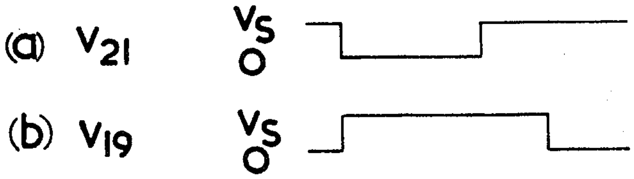
FIGURE 3 is a graph of waveforms occurring in the circuit of FIGURE 2.

FIGURE 3 shows the voltages applied to the terminals 21 and 19 in two graphs (*a*) and (*b*) respectively.

Figure 4:
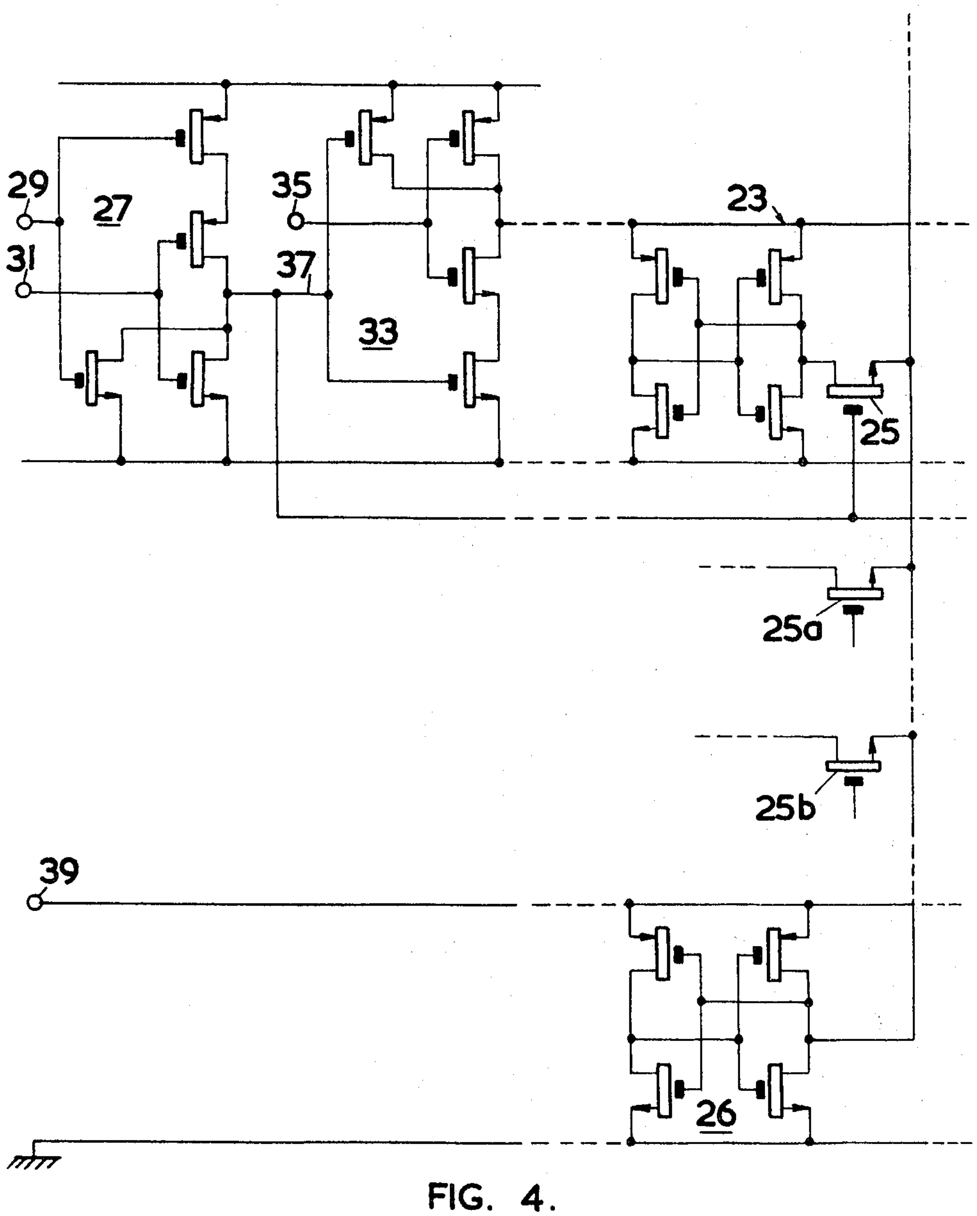
FIGURE 4 is a circuit diagram of part of a digital store incorporating I.G. bistable circuits.

FIGURE 4 shows this transfer system applied to a digital store, using a two-coordinate word selection system. Each bit is stored in a four-transistor bistable circuit such as is described above with respect to FIGURE 1, each having a single selection transistor associated with it. A single bistable circuit 23 is shown together with its selection transistor 25. Other selection transistors 25*a*, 25*b* are also shown leading to other words. An input/output register is connected in the same way as a word except that it has no selection transistor (such as 25). A single bistable circuit 26 belonging to the input/output register is shown.

The supply voltage and selection transistor gates are common to all the digits of one word. The word is selected by a conventional two-input M.O.S. transistor NAND gate, the "word selection" gate, which turns on all the selection transistors of the one word having both gate inputs energised. A single NAND gate 27 is shown, with its two input terminals 29 and 31. To write into the store, the supply voltage of the selected word is simultaneously reduced to zero by a second NAND gate, driven by a "write" pulse common to all words (as one of its two inputs), and the output of the "word selection" gate (as the other input). A NAND gate 33 is shown, having a "write" pulse input terminal 35 as one input, and a connection 37 from the NAND gate 27 as its other input. The "write" pulse ends before the "word selection" pulse, thus restoring the word supply voltage and setting the bistables to the same state as the store input/output register as previously described.

To read from the store, the required word is selected as above, but the supply voltage of the input/output register is interrupted via a terminal 39. This register is therefore set to the state of the selected word non-destructively.

Figure 5:
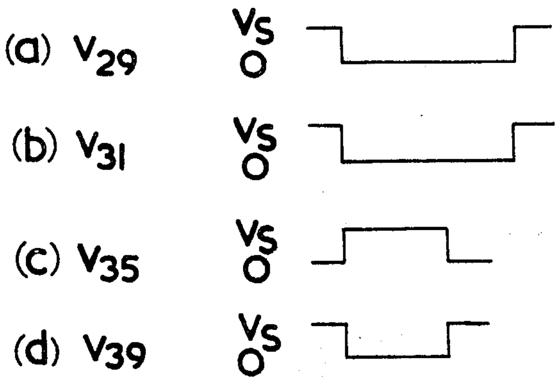
FIGURE 5 is a graph of waveforms occurring in the circuit of FIGURE 4.

FIGURE 5 shows the voltages applied to the terminals 29, 31, 35 and 39 in four graphs (*a*), (*b*), (*c*) and (*d*) respectively. The voltages in the graphs (*a*), (*b*) and (*c*) are used for writing words into the store and the voltages in the graphs (*a*), (*b*) and (*d*) are used for reading words out of the store.

This storage system uses five transistors per bit of store, plus eight additional selection transistors per word. For example, for a 24 bit word, this averages out at 5.33 transistors per bit, and no other components.

No mention has been made up till now of the substrate connection of the transistors. I.G. transistors are constructed in such a way that the source substrate and drain-substrate junctions form diodes. Normally, the substrate is connected to the source, so that there is in effect a diode between drain and source. For the normal electrode polarities (drain positive with respect to source for n-channel and vice versa for p-channel), this diode is reverse biased and does not affect the transistor characteristics. However, if for any reason the drain and source polarities are reversed, the diode conducts and affects the operation of the circuit.

Figure 6:
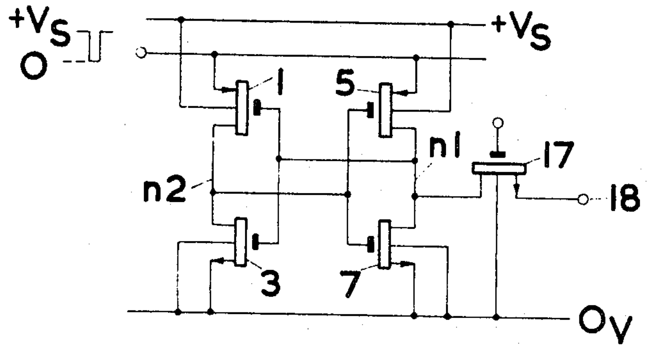
FIGURES 6, 7, 8, 9, 10 and 11 are circuit diagrams of bistable circuits.

This situation occurs for the p-channel transistors 1 and 5 in the bistable storage element described with reference to FIGURE 1 during the negative-going edge of the supply voltage pulse, and also for the gate transistor 17 in FIGURE 2. To avoid the effects, the substrate must be taken to a fixed voltage supply, chosen so that the drain-substrate or source-substrate diodes never become forward biased. This is shown in FIGURE 6, which only differs from the relevant part of FIGURE 2 in the taking of the substrates of the p-channel transistors 1 and 5 to the constant voltage $V_S$ and those of the remaining transistors to earth.

However, it is then possible for the substrate to be reverse biased with respect to the source, and it is found that this tends to turn the transistor off. (The actual effect of reverse bias of the source-substrate junction is to increase the threshold voltage of the transistor, i.e. the gate-source voltage necessary to just turn the transistor on. For n-channel transistors as used in switching circuits, the threshold voltage is positive, and is made more positive by a negative voltage on the substrate with respect to source, and vice versa for the p-channel.)

Memory effect

The effect of the threshold voltage of the p-channel transistors 1 and 5 (FIGURE 6), is to prevent the node initially at $+V_S$ from falling all the way to OV when the supply voltage is pulsed to zero, thus introducing a "memory" of the initial state of the bistable.

For example, suppose node 1 (*n1* in FIGURE 6) was initially at OV and node 2 (*n2* in FIGURE 6) at $+V_s$ i.e. the transistors 5 and 3 off, and the transistors 1 and 7 on. When the supply voltage falls to zero, the potential of node 2 cannot instantaneously, due to the transistor input and output capacitances, and the drain of the transistor 1 therefore becomes positive with respect to its source. Under these circumstances, the transistor 1 operates in the inverted mode, with the functions of drain and source interchanged. The gate and "drain" voltages are then zero, and the "source" and substrate initially at $+V_S$. The transistor 1 acts as a source follower, discharging the capacitance of node 2. However, as the voltage of node 2 falls, the gate-"source" voltage of the transistor 1 falls, and at the same time its threshold voltage increases, due to the increasing "source"-substrate reverse bias. As soon as the gate-"source" voltage of the transistor 1 becomes less than its threshold voltage, it ceases to conduct and node 2 capacitance cannot be discharged any further (except by the very small leakage currents of the transistors). The voltage left at node 2 constitutes a "memory" of the initial state of the bistable, causing it always to set back to its initial state when the supply voltage is restored. The memory generally has such a long time constant that it is impractical to wait for it to decay away, and it must therefore be destroyed in some way whenever it is required to change the state of the bistable.

Consider now the effect of this memory on the operation of the storage element shown in FIGURE 6. The terminal 18 is connected to one node of a second bistable, and is therefore at a voltage of O or $+V_s$, depending on the state it is required to write into the storage element. There are four possible initial states:

| | Node 1 | Node 2 | Terminal 18 |
|---|---|---|---|
| (a) | O | $+V_s$ | O |
| (b) | $+V_s$ | O | $+V_s$ |
| (c) | $+V_s$ | O | O |
| (d) | O | $+V_s$ | $+V_s$ |

Cases (*a*) and (*b*) are trivial, since the bistable is not required to change state and the memory effect therefore aids the writing process.

In case (*c*), the transistors 1 and 7 are initially off, and the transistors 3 and 5 on. When the supply voltage is reduced to zero, node 2 remains at OV, and node 1 would fall to a voltage determined by the characteristics of the transistor 5 as described above, except that the transistor 17, the selection transistor, is simultaneously turned on. Since its source and substrate are both at OV, and its gate at $+V_S$, it turns on hard and rapidly discharges node 1 capacitance to OV, destroying the memory. When the supply voltage is restored the transistor 17 clamps node 1 at OV, therefore the transistor 1 turns on, node 2 voltage rises, and the bistable sets into the required state.

In case (*d*), the transistors 1 and 7 are initially conducting, and the transistors 3 and 5 off. When the supply falls to zero, node 2 falls to a voltage depending on the characteristics of the transistor 1. If this voltage exceeds the threshold voltge of the transistor 7 (as it usually will), the transistor 7 will remain on. As the supply voltage falls, the transistor 17 is turned on and acts in the inverted mode, with gate and "drain" at $+V_s$, and "source" and substrate initially at OV. The current turned on by the transistor 17 flows into the transistor 7, raising the potential of node 1. This reduces the gate-"source" voltage of the transistor 17, and also reverse biases its "source" substrate junction, both causing a reduction in the current in the transistor 17, thus reducing the rise of voltage at node 1. The voltage of node 1 may also be restricted by the transistor 5 turning on in the inverted mode, since during the supply voltage pulse its "drain" and gate are at OV, thus it will turn on when its "source" potential (node 1) rises above its threshold voltage. These effects combine to set a limit to the rise in voltage of node 1. There are then two possibilities. If the limiting value of node 1 voltage is below the threshold voltage of the transistor 3, it will not turn on, thus the "memory" stored in the capacitance at node 2 is not discharged, and when the supply voltage is restored the bistable will set incorrectly to its initial state. However, if the limiting value of node 1 voltage exceeds the threshold voltage of the transistor 3 it will turn on and discharge node 2 capacity, reducing node 2 voltage to zero and therefore turning the transistor 7 off and allowing node 1 to rise to a voltage limited by the turn-on of the transistor 5. The node voltages are then unbalanced in the required sense, and restoration of the supply voltage will cause the bistable to set into the desired state.

It can be seen that correct operation in case (*d*) depends critically on the precise characteristics of all the transistors in the circuit, and even when correct operation occurs, the width of the supply voltage pulse for correct operation will be long since the internal memory opposes the required change in node voltages. The path for current via the transistors 17 and 5, 7 also produces excess power dissipation in case (*d*).

Improvements to basic circuit

The performance of the circuit in case (*d*) above could be improved by increasing the current turned on in the transistor 17 by increasing the amplitude of its gate voltage pulse above $V_s$. An alternative way of achieving the same object is to add a p-channel transistor 20 in parallel with the transistor 17 as shown in FIGURE 7.

In case (*d*), this will operate with a fixed gate-source voltage of $+V_s$, and source connected to substrate, and therefore maintains its low-impedance state as node 1 rises, unlike the transistor 17. Nevertheless, even with either of these modifications, it would still be possible for the circuit to work incorrectly if the transistors were subject to wide parameter spreads, and a more reliable method of transferring information between bistables is required.

Figure 7:
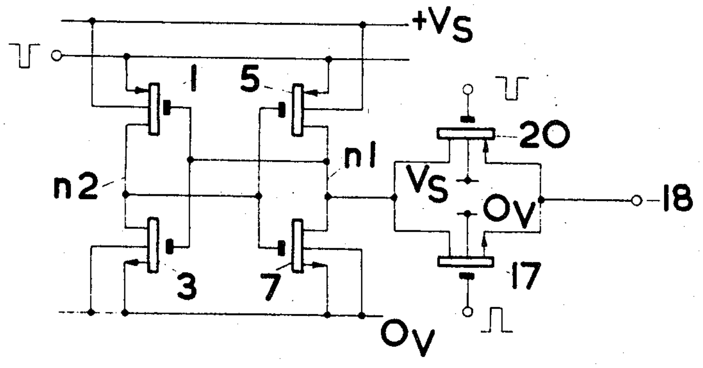
Figure 8:
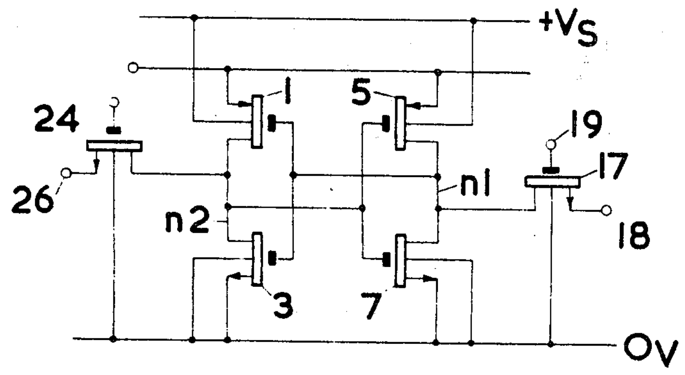

The fundamental difficulty in the circuits of FIGURES 6 and 7 is that there is no direct way of destroying the memory at node 2, and this must be done indirectly by raising the voltage of node 1, this being opposed by the action of the memory. A better scheme is shown in FIGURE 8, in which two selection transistors 17 and 22 are used to give direct access to each node.

The selection would be turned on simultaneously by a common gate waveform at the terminal 19 and a terminal 24 at the gate of the transistor 22 and terminals 18 and 26 at the sources of the transistors 17 and 22 respectively, supplied from the nodes of the bistable being read, being respectively O and $+V_s$ in case (*c*), above, and $+V_s$ and O in case (*d*). However, since the circuit is now symmetrical, the operation in these two cases is identical. Consider for example case (*d*), in which node 1 is initially at OV and node 2 at $+V_s$. When the supply voltage is reduced to zero, and the transistors 17 and 24 simultaneously turned on, the capacity of node 2 is discharged by both the transistor 1 in the inverted mode, as before, and also by the transistor 22. Since the transistor 22 has a fixed gate-source voltage $+V_s$, and substrate at source potential, it remains in its low impedance "on" state even with node 2 at OV, hence the memory at node 2 is rapidly destroyed. The presence of the transistor 22 in its low impedance state in itself balances the bistable sufficiently to ensure that it sets to the required state when the supply voltage is restored. However, since the rapid reduction of node 2 voltage ensures that the transistor 7 is "off," the transistor 17 also raises the potential of node 1, further unbalancing the bistable in the required direction.

This circuit is more reliable and faster than those described above, its main disadvantage being the need for two input/output lines instead of only one.

Use of substrate diode to destroy memory

An alternative means of destroying the "memory" at a node is to connect a diode between that node and the pulsed supply, with the cathode to the supply. Thus when the supply falls to zero, the diode conducts and discharges the node capacity to near zero volts, destroying the memory. To avoid a separate diode, it may be convenient to use the drain-substrate junction of the p-channel transistor driving the node, by connecting source and substrate together so that the drain-substrate diode is effectively connected between drain and source with the correct polarity.

Applying this scheme to the circuit of FIGURE 7 by connecting the substrate of the transistor 1 to the pulsed supply, in case (*d*) above the memory at node 2 is destroyed immediately the supply falls to zero thus the transistor 7 turns off immediately and the selection transistors 17 and 20 can raise the voltage at node 1 until the transistor 5 starts to conduct in the inverted state. Thus the bistable always takes up a state unbalanced in the required direction, and operation is faster and much more reliable than before. The substrate of the transistor 5 must continue to be connected to a fixed supply voltage, rather than to its source, since in case (*d*) node 1 must be taken positive. This need for isolated substrates for the transistors 1 and 5 might be inconvenient if the circuit were to be integrated on a single slice of semiconductor.

The circuit of FIGURE 8 does not depend for its correct operation on either node being raised in potential by the selection transistors, and so the substrates of the transistors 1 and 5 can both be connected to the pulsed supply, to give the fastest possible destruction of the memory for both states of the bistable. However, there is then an unwanted current path via the selection transistor going to $+V_s$ which conducts heavily in the inverted mode during the supply voltage pulse, since its "source" is held at OV by the drain-substrate diode of the relevant p-channel transistor, and its gate and "drain" are at $+V_s$. This causes unnecessary power dissipation and loads the bistable being read. Diodes could be inserted in series with the selection transistors to block the unwanted current, but their direction depends on whether the bistable is being read or written into.

The correct set of diodes would therefore have to be selected, by M.O.S. transistor switches say, and this would be much too complicated to use for transferring information between pairs of registers. The situation in a store is different, however, since a single input and output register is common to the whole store, thus only one set of diodes and switches is required, and the number of transistors per bit is hardly affected.

Review of pulsed H.T. systems

The basic circuit using a single selection transistor shown in FIGURE 6 cannot be relied on to work correctly with a wide range of transistors, due to the "memory" of the previous state of the bistable retained when the supply voltage is pulsed to zero. The addition of a p-channel selection transistor (FIGURE 7) gives little improvement. By using a second selection transistor (FIGURE 8), the circuit operation can be made reliable and faster, but two input/output lines are then required. Very rapid destruction of the internal memory can be achieved by using the pulsed supply to discharge the node capacities through diodes, which may conveniently be the drain-substrate junctions of the p-channel transistors, but in the circuit using two selection transistors, FIGURE 8, steps must be taken to avoid unwanted current paths which load the bistable being read and increase the power dissipation.

Theoretically, the energy dissipated in changing the state of a bistable is $CV_s^2$, where C is the total capacitance at each node (i.e. $\frac{1}{2}CV_s^2$ at each node). The energy dissipated in the circuits described above is greater than this value due to:

(a) Charge and discharge of the selection transistors gate capacity and interconnections;

(b) Charge and discharge of supply voltage line capacity, consisting of the reverse-biased source-substrate junction capacity of the p-channel transistors, or the capacity between the p and n substrates, depending on the substrate connection of the p-channel transistors, plus the capacity of the interconnections.

When the information to be written into the bistable is the same as that already contained in it, the theoretical energy dissipation is zero. In practice, the enery due to (*a*) and (*b*) above will still be dissipated, and in addition there will be energy due to any change in the node voltages which may occur. In particular, when diodes are used to destroy the memory, as described above the node at $+V_s$ is always discharged to OV whether a change of state is required or not, and the energy dissipation is therefore the same in both cases. There will also be excess energy dissipation due to continuous current paths in certain cases, for example via the transistors 17 and 5 or 7, or the transistors 28 and 1 or 3 in FIGURE 8, during the period when the supply voltage is at zero.

The mean power consumption of the pulsed supply system is therefore considerably greater than the theoretical minimum.

"Switched feedback" method of information transfer

The basic four-transistor bistable element may be regarded as two inverter/amplifier stages connected in cascade, with the output connected back to the input to give 100% positive feedback. This feedback gives rise to the two stable states, and hence initially opposes any attempt to change the state of the bistable. The method of pulsing the supply voltage is in effect a method of removing the feedback by turning all four transistors off, the "memory" opposing this action by holding one transistor on.

Figure 9:
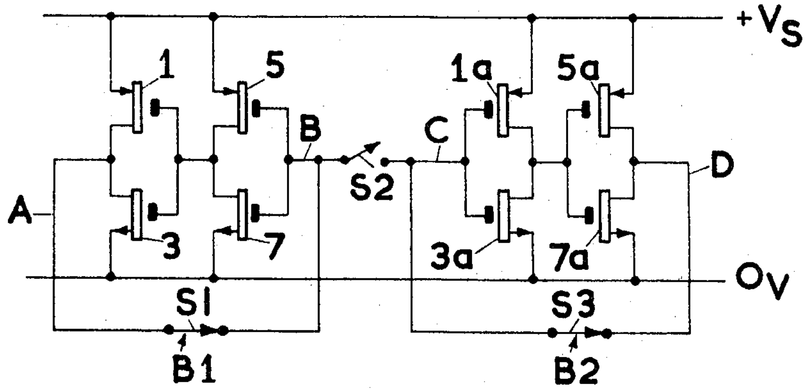

A more direct and effective means of controlling the feedback in the bistable is to use a switch in the feedback path, as shown diagrammatically by two switches S1 and S3 in FIGURE 9. A third switch S2 connects two bistable circuits B1 and B2. (In practice, and I.G. transistor would be used as the switch, as discussed later.)

Normally, the switches S1 and S3 are closed and the switch S2 open, and the bistables are isolated in one or other of their stable states. Suppose it is required to set the bistable B2 to the state of the bistable B1. The switch S3 would be opened, removing the feedback from the bistable B2, and the switch S2 closed, connecting the point C to the low impedance node A of the bistable B1 via the switch S1. Since the point C is disconnected from the low impedance node D of the bistable B2, it can rapidly change its potential to that of the points B and A (assuming the bistables B1 and B2 are not already in the same state). The change of potential at the point C, from O to $+V_s$ or vice versa, propagates through the inverters 1*a*, 3*a* and 5*a*, 7*a*, finally appearing at the point D with the same voltage as at the point C. The switch S3 may then be closed and the switch S2 opened, leaving the bistable B2 storing the required state. Similarly to set the bistable B1 to the state of the bistable B2, the switch S1 is opened and the switch S2 closed, then after a time sufficient for the bistable B1 to settle to its new state, the switch S1 is closed and the switch S2 opened again. The timing of the switch operations is not critical, provided that the relevant feedback switch S1 or S3 is always opened before the switch S2 is closed. It does not matter if the switch S2 is reopened before the switch S1 or S3 is reclosed, since the input capacity of the transistors 5, 7 or 1*a*, 3*a* acts as a memory of the required state for a considerable time.

This system has several advantages over the "pulsed supply" system. It will be much faster, since the change of state starts as soon as the switch S2 is closed, and can propagate rapidly through the inverters, whereas with the pulsed supply system the bistable does not start switching to its final state until the trailing edge of the supply voltage pulse. Also, this system should dissipate less power, since in the case in which the bistable is already in the required state no voltage changes occur, and hence no power is dissipated in the bistable itself. The only power required is that necessary to drive the switches, i.e. to drive the input capacity of the M.O.S. transistors used as switches, and this will probably be much less than that required to pulse the supply line.

Figure 10:
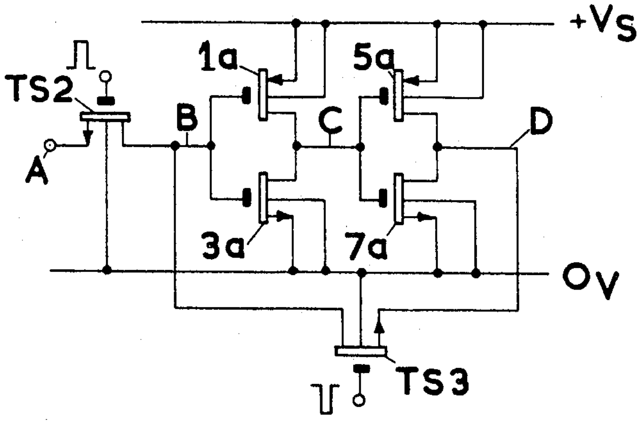

FIGURE 10 shows a practical storage element using M.O.S. transistors in place of the switches in FIGURE 9.

The substrates of all the bistable transistors can now be connected to their source, but the substrates of the transistors TS2 and TS3 must be taken to OV to avoid forward biasing their drain-substrate junctions. If a common supply voltage is used throughout for the storage elements and the selection circuitry, the gate waveforms of the transistors TS2 and TS3 will have the same amplitude of the supply $+V_s$. In this case, the point B can never be raised fully to $+V_s$. For example, consider the stable state in which the point C is at OV and the point D at $+V_s$ (TS2 off). The transistor TS3 operates in the inverted mode, with gate and "drain" at $+V_s$, and therefore can only conduct when its "source," the point B, is below $+V_s$ by at least its threshold voltage (which will be increased above its normal value by the reverse substrate bias). Although the point B would probably be sufficiently positive to give the required stable state, the transistor 1*a* would not turn fully off and the quiescent power consumption would be much increased.

A similar argument applies to the transistor TS2 during the change of state in which the point B is initially at OV and is to be switched positive, except that since the point A is connected to a point in the driving bistable corresponding to the point B, the transistor corresponding to TS3 appears between the transistor TS2 and the low impedance node of the driving bistable at $+V_s$, even further reducing the rise in voltage of the point B.

One solution to this problem is to increase the amplitude of the voltage pulses applied to the gates of the transistors TS2 and TS3. Provided that the gate voltage exceeds $+V_s$ by at least the threshold voltage (measured with a reverse source-substrate bias of $V_s$), the transistor will remain "on," even with both source and drain at $+V_s$, and the point B can therefore be fully switched. However, the circuit operation is then asymmetric, the change of state in which the point B switches from O to $+V_s$ being slower than when the point B switches from $+V_s$ to O. Also, since in a store the address and selection information is often derived from information already in the store, amplifiers will be required to increase the store output voltage swing of $V_s$ to a level suitable for the selection circuits.

Figure 11:
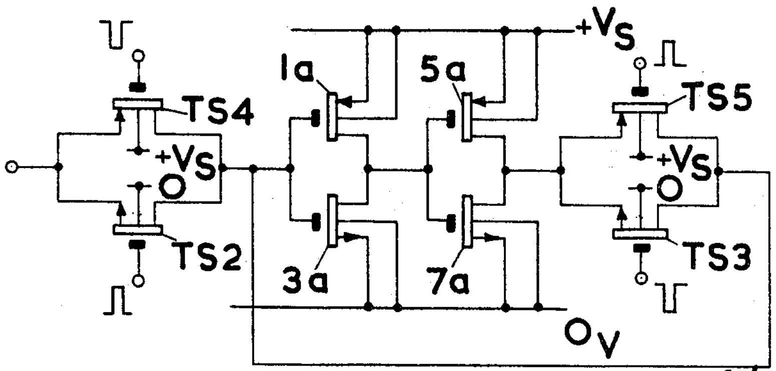

An alternative solution is to connect p-channel transistors in parallel with the transistors TS2 and TS3, as shown in FIGURE 11.

Corresponding p and n channel transistors are driven by complementary gate waveforms of amplitude $V_s$ and the circuit is symmetrical and switches equally rapidly in either direction. The disadvantage of this scheme is that it requires two more transistors per bit of storage, and two additional selection voltage pulses.

Store organisation in "switched feedback" system

Figure 12:
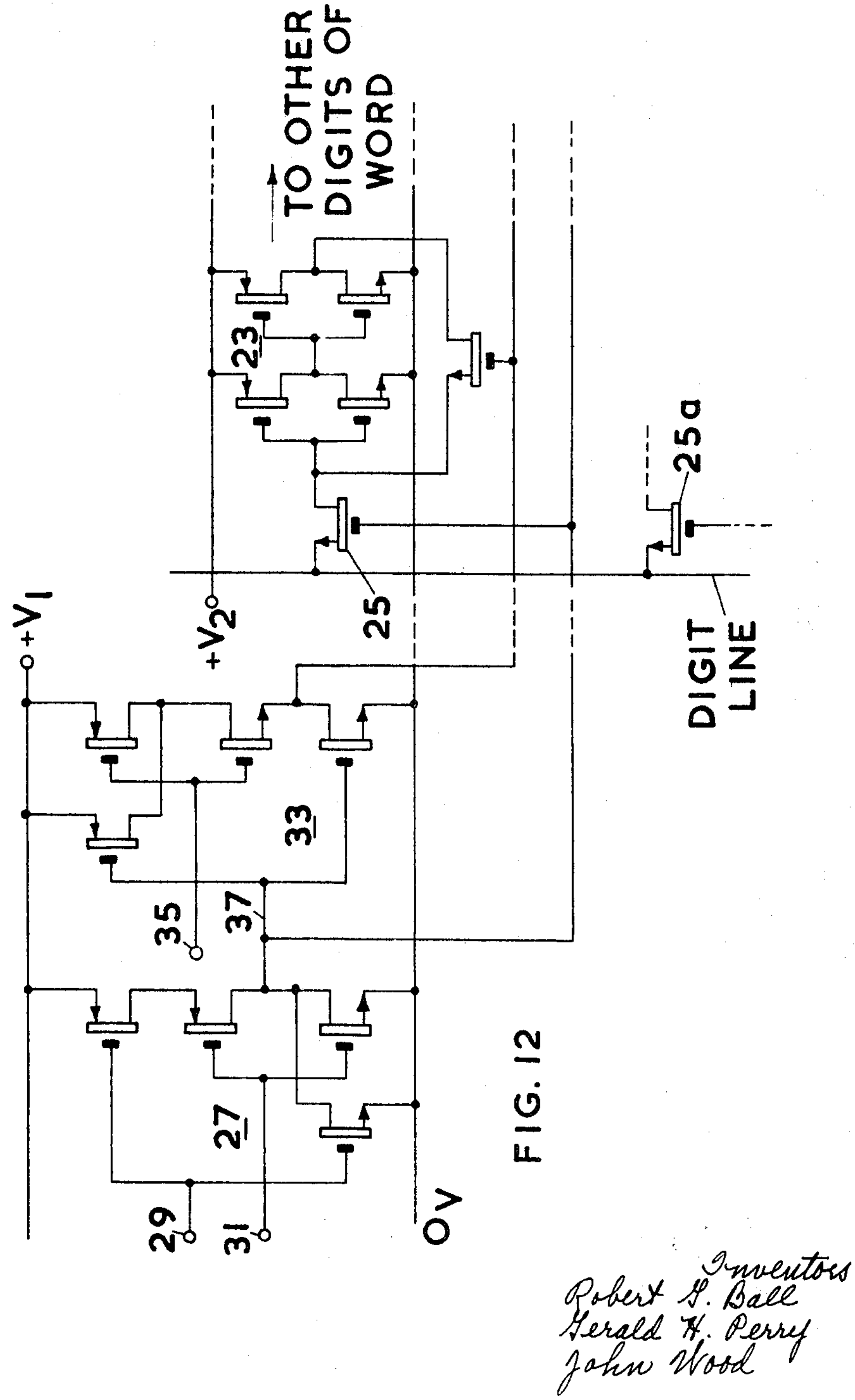
FIGURE 12 is a circuit diagram of part of a digital store using I.G. transistor bistable circuits.
Figure 13:
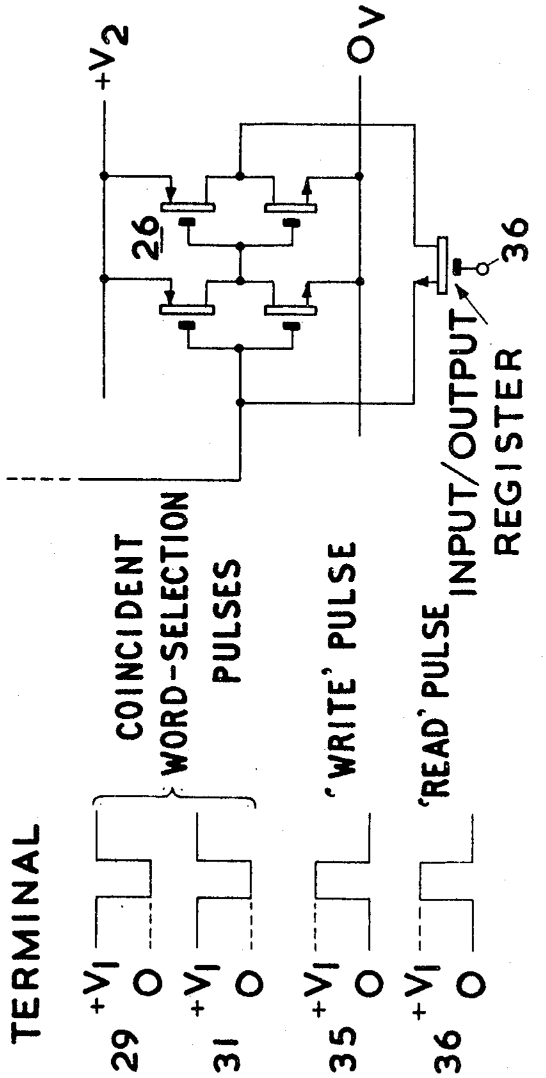
FIGURE 13 is a series of graphs of waveforms occurring in the circuit described with reference to FIGURE 12.

The "switched feedback" bistable element would be used in a store in a very similar manner to that described in the original specification for the pulsed supply system (FIGURE 4). A circuit is shown in FIGURE 12, using increased amplitude gate voltage pulses on the selection transistors.

The word selection circuit supply voltage V1 is greater than the bistable supply voltage V2 to provide the necessary amplitude of selection pulses. If the alternative scheme of FIGURE 11 is used, V1 and V2 are equal, but two inverters must be added to the word selection circuit to generate the required complementary gate waveforms.

Figures 14, 15, 16, 17:
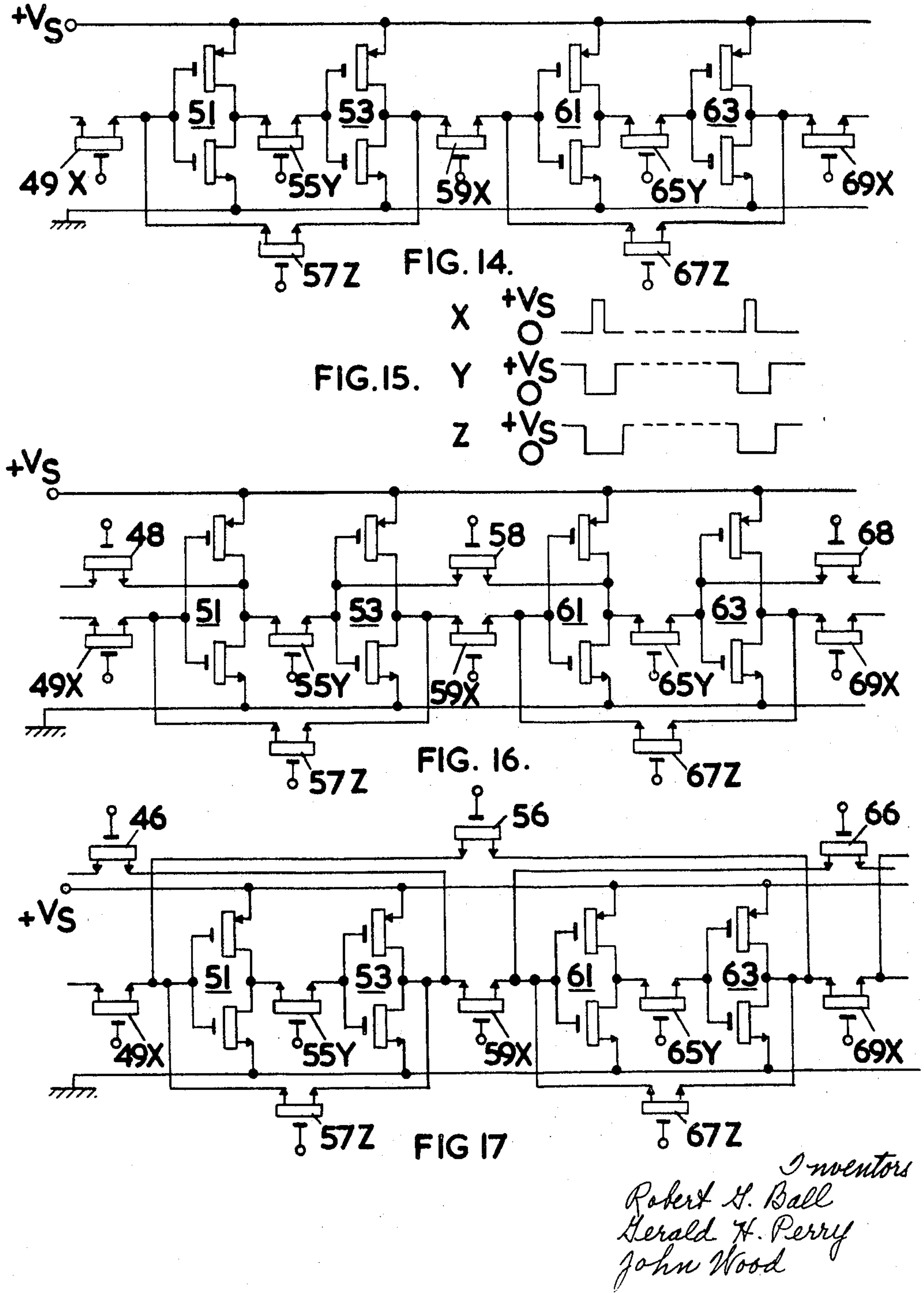
FIGURE 14 is a circuit diagram of a shift register.
FIGURE 15 is a series of graphs of waveforms occurring in the circuit described with reference to FIGURE 14.
FIGURES 16 and 17 are circuit diagrams of alternative reversible shift registers.

FIGURE 16 is a circuit diagram of a shift register embodying the invention. Two complementary pairs of I.G. transistors 51, 53 are connected in a bistable circuit with a transistor 55Y connected in one node and a transistor 57Z in the other node. This part of the circuit constitutes one stage of the counter and is connected to a similar bistable circuit constituting the next stage via a transistor 59X. The bistable circuit constituting the next stage includes two complementary pairs of transistors 61, 63 with a transistor 65Y connected in one node and a transistor 67Z in the other node. The output of the second stage is applied via a transistor 69X. Similarly the input to the first stage is applied via a transistor 49X.

The action of the circuit is as follows. Normally the transistors 55Y, 57Z, 65Y and 65Z are kept turned on by suitable voltages applied to their gate electrodes and the transistors 49X, 59X and 69X are kept turned off. In this way all the bistables will remain in their respective states. When the information is to be shifted, firstly the transistors 55Y, 57Z, 65Y and 67Z are turned off. The voltages of the drain electrodes will not decay instantaneously, however, and the transistors 49X, 59X and 69X are turned on, propagating the information from the second transistor pair (such as 53) of each bistable to the first transistor pair (such as 61) of the next bistable. The transistors 49X, 59X and 69X may then be turned off, and the transistors 55Y and 65Y turned on, propagating the information to the second pair such as 53 or 63 of each bistable. Finally the transistors 57Z and 67Z may be turned on again to stabilise the information.

For convenience the transistors 49X, 59X and 69X will be referred to hereinafter as the X transistors, the transistors 55Y and 65Y as the Y transistors and the transistors 57Z and 67Z as the Z transistors. FIGURE 15 consists of three graphs X, Y and Z representing the voltages applied to the gates of the X, Y and Z transistors respectively. The allowable switching time (i.e. the time for which the Z transistors remain cut off) depends on the gate capacitance to earth of the transistors (which may be low) and input resistance of the transistors (which is very high), and so a definite value cannot be given here. In suitable cases values between a microseconds and a millisecond may be suitable. When switching is not taking place, of course, the information will remain staticised indefinitely while the power supply is on.

The register may be made reversible in two ways, of which one is illustrated in FIGURE 16. The register illustrated in FIGURE 16 differs from that illustrated in FIGURE 14 in having additional transistors 48, 58, 68 connected between the gates of the second pairs of transistors (such as 53) and the drains of the first pairs of transistors (such as 61). In order to reverse the information flow the Y waveform is applied to the Z transistors, the Z waveform is applied to the Y transistors and the X waveform is applied to the transistors such as 48, 58 and 68.

An alternative way is illustrated in FIGURE 17. The register illustrated in FIGURE 17 differs from that illustrated in FIGURE 14 in having additional transistors 46, 56, 66 connected from the output of one stage (i.e. the drains of the second pair of transistors such as 63) back to the input of the previous stage (i.e. the gates of the first pair of transistors such as 51). In order to reverse the information flow the X waveform is applied to the transistors such as 46, 56 and 66 instead of the X transistors. The Y and Z transistors receive the same waveform as before.

We claim:

1. A digital storage device comprising a first bistable circuit and a second bistable circuit each comprising a first complementary pair of field effect transistors whose channels are connected in series between two terminals and whose gates are connected together, a second complementary pair of field effect transistors whose channels are connected in series between two terminals and whose gates are connected together, a connection between the common series connection between said channels of said first complementary pair and said gates of second complementary pair, a connection between the common series connection between said chainnels of said second complementary pair and said gates of said first complimentary pair, supply voltage terminals, and a connection between said terminals and said supply voltage terminals, means for connecting said common series connection between said channels of said second complementary pair of said first bistable circuit to said gates of said first complementary pair of said second bistable circuit, and means for breaking one of said connections in said second bistable circuit at a time when said common series connection between said channels of said complementary pair of said first bistable circuit is connected to said gates of said first complementary pair of said second bistable circuit.

2. A digital storage device as claimed in claim 1 and comprising means for breaking one of said connections in said first bistable circuit at a time when said common series connections between said channels of said second complementary pair of said first bistable circuit is connected to said gates of said first complementary pair of said second bistable circuit.

3. A digital storage device as in claim 1, in which the said means for breaking one of said connections in said second bistable circuit comprises means for breaking said connection between said terminals and said supply voltage terminals.

4. A digital storage device as in claim 3, in which said means for connecting comprises an electrical connection with a switching transistor connected therein.

5. A digital storage device as in claim 3, in which said means for connecting comprises an electrical connection with two switching transistors connected in parallel therein.

6. A digital storage device as in claim 2, in which said means for breaking one of said connections in said second bstable circuit comprises means for breaking said connection between said terminals and said supply voltage terminals.

7. A digital storage device as in claim 6, in which each said means for connecting comprises an electrical connection with a switching transistor connected therein.

8. A digital storage device as in claim 1, in which said means for breaking one of said connections in said second bistable circuit comprises means for breaking one of said connections between said common series connection between said channels of a complementary pair of transistors within said second bistable circuit and said gates of the other complementary pair of transistors within said second bistable circuit.

9. A digital storage device as in claim 8, in which said means for breaking said connection comprises a switching transistor connected therein.

10. A digital storage device as in claim 8, in which said means for breaking said connection comprises two switching transistors connected in parallel therein.

11. A digital storage device as in claim 8, in which said means for connecting comprises an electrical connection with a switching transistor connected therein.

12. A digital storage device as in claim 8, in which said means for connecting comprises an electrical connection with two switching transistors connected in parallel therein.

13. A digital storage device as in claim 8, in which said means for breaking said connection comprises two switching transistors connected in parallel therein and said means for connecting comprises an electrical connection with two switching transistors connected in parallel therein.

14. A digital storage device as in claim 1, in which said second bistable circuit is an element of a digital store representing a binary digit and said first bistable circuit is an element of an auxiliary register, and comprising writing means for transferring a digit stored in said auxiliary register to said digital store and reading means for transferring a digit stored in said digital store to said auxiliary register, wherein said writing means comprises said means for connecting and said means for breaking one of said connections in said second bistable circuit at a time when said means for making a connection is operated and said reading means comprises said means for connecting and means for breaking one of said connections in said first bistable circuit at a time when said means for connecting is operated.

15. A digital storage device as in claim 14, in which said means for breaking one of said connections in said second bistable circuit comprises means for breaking said connection between said terminals and said supply voltage terminals and said means for breaking one of said connections in said first bistable circuit comprises means for breaking said connection between said terminals and said supply voltage terminals.

16. A digital storage device as in claim 14, in which said means for breaking one of said connections in said second bistable circuit comprises means for breaking one of said connections between said common series connection between said channels of a complementary pair of transistors within said second bistable circuit and said gates of the other complementary pair of transistors within said second bistable circuit and said means for breaking one of said connections in said first bistable circuit comprises means for breaking one of said connections between said common series connections between said channels of a complementary pair of transistors within said first bistable circuit and said gates of the other complementary pair of transistors within said first bistable circuit.

17. A digital storage device as in claim 1 wherein each bistable circuit comprises a first switch in said connection between said common series connection between said channels of said first complementary pair of transistors and said gates of said second complementary pair of transistors and a second switch in said connection between said common series connection between said channels of said second complementary pair of transistors and said gates of said first complementary pair of transistors, said means for connecting comprises a third switch connected from said common series connection between said channels of said second complementary pair of said first bistable circuit to said gates of said first complementary pair of said second bistable circuit and said means for breaking one of said connections, in said second bistable circuit comprises means for opening said first switches and said second switches.

18. A digital storage device as in claim 17, and further comprising a fourth switch connected from said common series connection between said channels of said first complementary pair of said second bistable circuit to said gates of said second complementary pair said first bistable circuit.

19. A digital storage device as in claim 17 and further comprising a fourth switch connected from said common series connection between said channels of said second complementary pair of said second bistable circuit to said gates of said first complementary pair of said first bistable circuit.

References Cited

UNITED STATES PATENTS

| | | | |
|---|---|---|---|
| 3,051,848 | 8/1962 | Clark | 307—88.5 |
| 3,134,912 | 5/1964 | Evans | 307—88.5 |
| 3,168,649 | 2/1965 | Meyers | 307—88.5 |
| 3,267,295 | 8/1966 | Zuk | 307—88.5 |

ARTHUR GAUSS, *Primary Examiner.*

H. DIXON, *Assistant Examiner.*

U.S. Cl. X.R.

307—247, 251